US006596977B2

(12) United States Patent
Muthu et al.

(10) Patent No.: US 6,596,977 B2
(45) Date of Patent: Jul. 22, 2003

(54) AVERAGE LIGHT SENSING FOR PWM CONTROL OF RGB LED BASED WHITE LIGHT LUMINARIES

(75) Inventors: Subramanian Muthu, Ossing, NY (US); Frank Schuurmans, Valkenswaard (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 55 days.

(21) Appl. No.: 09/972,111

(22) Filed: Oct. 5, 2001

(65) Prior Publication Data

US 2003/0066945 A1 Apr. 10, 2003

(51) Int. Cl.[7] .......................... G01J 1/32; H05B 41/36; G09G 3/32

(52) U.S. Cl. ....................... 250/205; 315/307; 315/158; 345/82; 345/83

(58) Field of Search ............................ 250/205, 214 R, 250/214 AG, 552; 327/514; 356/221–223; 315/291, 307–309, 158, 159; 345/82, 83

(56) References Cited

U.S. PATENT DOCUMENTS 5,783,909 A * 7/1998 Hochstein
6,472,946 B2 * 10/2002 Takagi

* cited by examiner

*Primary Examiner*—David Porta
*Assistant Examiner*—David C Meyer

(57) ABSTRACT

An LED array is controlled by determining a constant relating the peak light output of an LED to the peak driving current of a PWM pulse driving the LED, and multiplying the average current of the PWM pulse by the constant to obtain a value of average light output for the LED. The constant may be determined by simultaneously measuring peak light output of the LED and peak current of a PWM pulse driving the LED. The constant is then calculated by dividing the peak light output by the peak current of the PWM pulse. By making the simultaneous measurements at a time during the duration of the PWM pulse where the pulse has reached its full magnitude, rise and fall times of the pulse do not affect the measurements. The average current of the PWM pulse may be determined by a variety of methods including integrating current in the PWM pulse over time, or passing the PWM current through a low pass filter configured for providing an average value of PWM current. Determining average current in this manner further reduces the effect of rise and fall time on determining the average light output of the LED.

21 Claims, 5 Drawing Sheets

AVERAGE LIGHT SENSING FOR PWM CONTROL OF RGB LED BASED WHITE LIGHT LUMINARIES

TECHNICAL FIELD OF THE INVENTION

This invention relates to controlling the light output of LED displays, and more particularly to controlling LED displays having drive current provided in the form of PWM pulses.

BACKGROUND OF THE INVENTION

Where a light display is generated from the combined output of an array of red, green, and blue light emitting diodes (RGB LED array) the intensity of light output from the individual light emitting diodes must be closely monitored and controlled to achieve a desirable combined light output from the array. In many applications of such arrays, such as LCD monitors, it is preferred to drive the array with pulse width modulated (PWM) current pulses. By controlling the shape, duration, and frequency of the PWM pulses, the light output of the individual LEDs and the array can be closely controlled.

Prior control systems have utilized direct measurement of average light intensity, and in some cases have also attempted to utilize a measurement of forward drive current supplied to the LEDs, for controlling the light output of an RGB array. Difficulties in measuring the individual light outputs, and inaccuracies in current measurement caused by dealing with ripple current and rise and fall times of the current at the beginning and end of the PWM pulses have limited the effectiveness of such prior control systems.

SUMMARY OF THE INVENTION

Our invention provides improved control of an LED array by determining a constant relating the peak light output of an LED to the peak current of a PWM pulse driving the LED, and multiplying the average current of the PWM pulse by the constant to obtain a value for the average light output for the LED.

In one form of our invention, the constant is determined by simultaneously measuring peak light output of the LED and peak current of a PWM pulse driving the LED. The constant is then calculated by dividing the peak light output by the peak current of the PWM pulse. By making the simultaneous measurements at a time during the duration of the PWM pulse where the pulse has reached its full magnitude, rise and fall times of the pulse do not affect the measurements.

Determination of average current of the PWM pulse can be accomplished in a variety of ways. In one form of our invention, the average current of the PWM pulse is determined by integrating current in the PWM pulse over time. Determining average current in this manner further reduces the effect of rise and fall time on determining the average light output of the LED. Alternatively, the average current can be determined by sensing the current of the PWM pulse, and passing the sensor output through a low-pass filter, or an integrator, configured for producing an average current signal.

For arrays having two discrete colored LEDs driven by PWM pulses that partially overlap as a function of time, and having only a single sensor for measuring light output of the LEDs, our invention may be practiced by simultaneously measuring peak light output and current of one of the LEDs at a point in time when the PWM pulses do not overlap, simultaneously measuring the combined peak light output of both LEDs and the peak current of the PWM pulse driving the second LED at a time when the PWM pulses do overlap, and determining the peak light output of the second LED by subtracting the measurement of the light output of the first LED from the combined light output of both LEDs. The constants relating the peak light output to the peak current of each LED may then be calculated by dividing the peak light output of each LED by its respective peak current. The same methodology may be utilized in practicing our invention in arrays having more than two discrete colored LEDs.

The repetition rate for determining the average light output may be repeated as often as is required to obtain the accuracy desired for a given application. For applications having multiple LEDs, and single or multiple light sensors, our invention contemplates the use of multiplexing hardware or software for coordinating measurement and processing of the various measurements required for determining the constants and average currents. In some forms of our invention, the repetition rate for the measurements may be determined as a function of a measurable parameter, such as the temperature of the LED, or a heat sink attached to the LED.

We contemplate that our invention may be practiced as a method, or embodied in an apparatus, or embodied in a code on computer readable medium.

The foregoing and other features and advantages of my invention will become further apparent from the following detailed description of exemplary embodiments, read in conjunction with the accompanying drawings. The detailed description and drawings are merely illustrative of my invention rather than limiting, the scope of the invention being defined by the appended claims and equivalents thereof.

DETAILED DESCRIPTION OF THE PRESENTLY PREFERRED EMBODIMENTS

Figure 1:
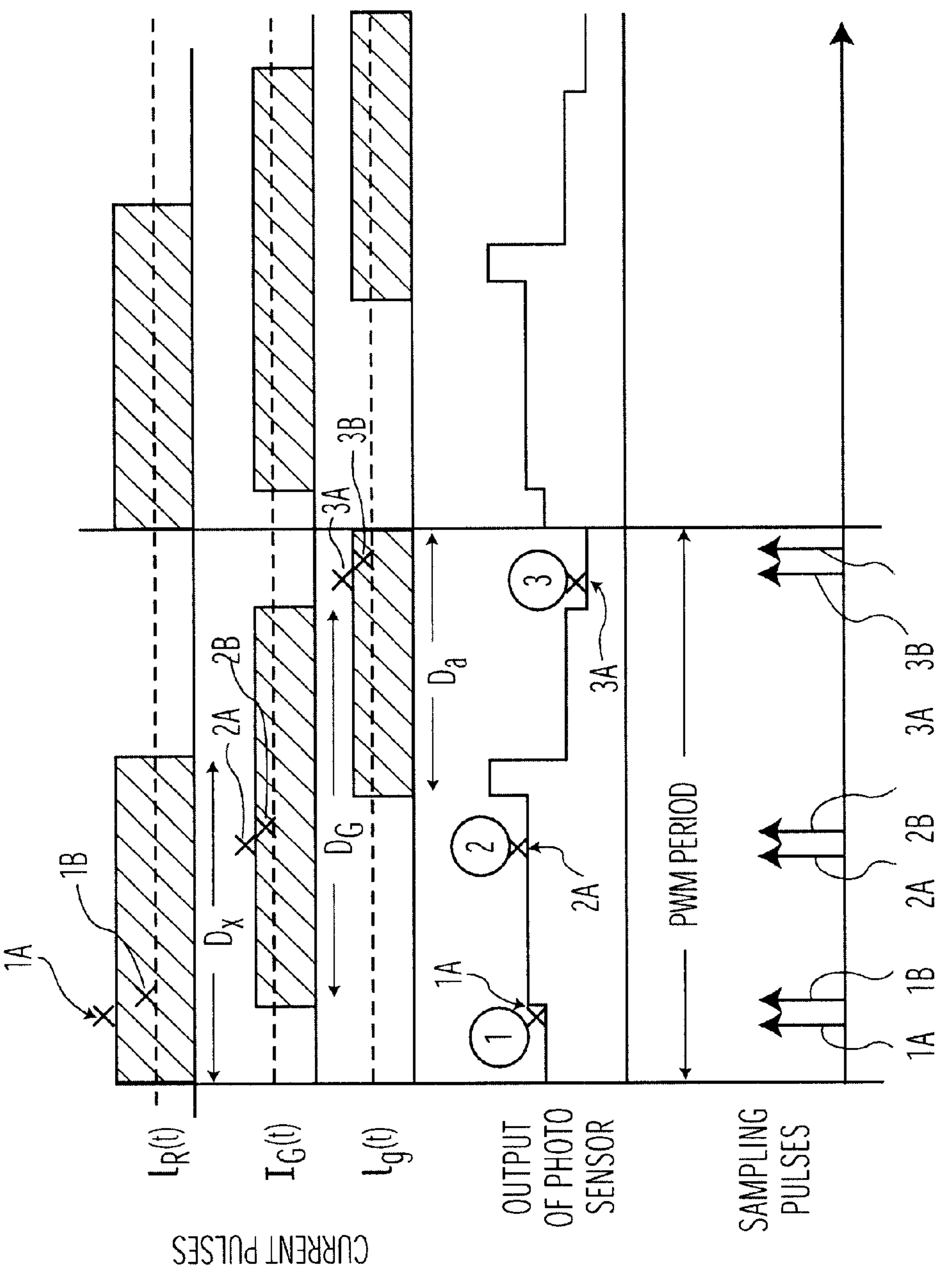
FIG. 1 is a signal diagram showing the relationship of an RGB LED array driven by PWM current pulses, in accordance with my invention.

FIG. 1 is a signal diagram showing the relationship of light output of an array of a red, a green, and a blue light emitting diode (RGB LED), to a PWM pulse driving each LED in a typical white light projection system of a type in which our invention may be practiced. It will be noted that, for practical purposes, the light output of the LED is directly proportional to the current driving the LED. It should further be noted that, to facilitate the description and understanding of our invention, the PWM pulses as illustrated do not show any ripple, or distortion at the leading and trailing edges of the pulses for rise and fall time effects that would likely be present in any actual application of our invention. Those having skill in the art will recognize that our invention provides unique capabilities to operate as described below, even where ripple and rise and fall time effects are present.

The durations of the PWM pulses in FIG. 1 driving the red, green and blue LEDs are indicated respectively as $D_R$, $D_G$, $D_B$, and the average currents are indicated respectively as $I_{R-av}$, $I_{G-av}$, $I_{B-av}$. During the PWM period, the durations of the PWM pulses $D_R$, $D_G$, $D_B$ overlap, as a function of time, for a portion of the PWM period. As a result of this overlapping, it is not possible to find a time during the PWM period when the light output of the green LED can be directly measured by a single light sensor oriented to receive the light output of all three LEDs.

Figure 2:
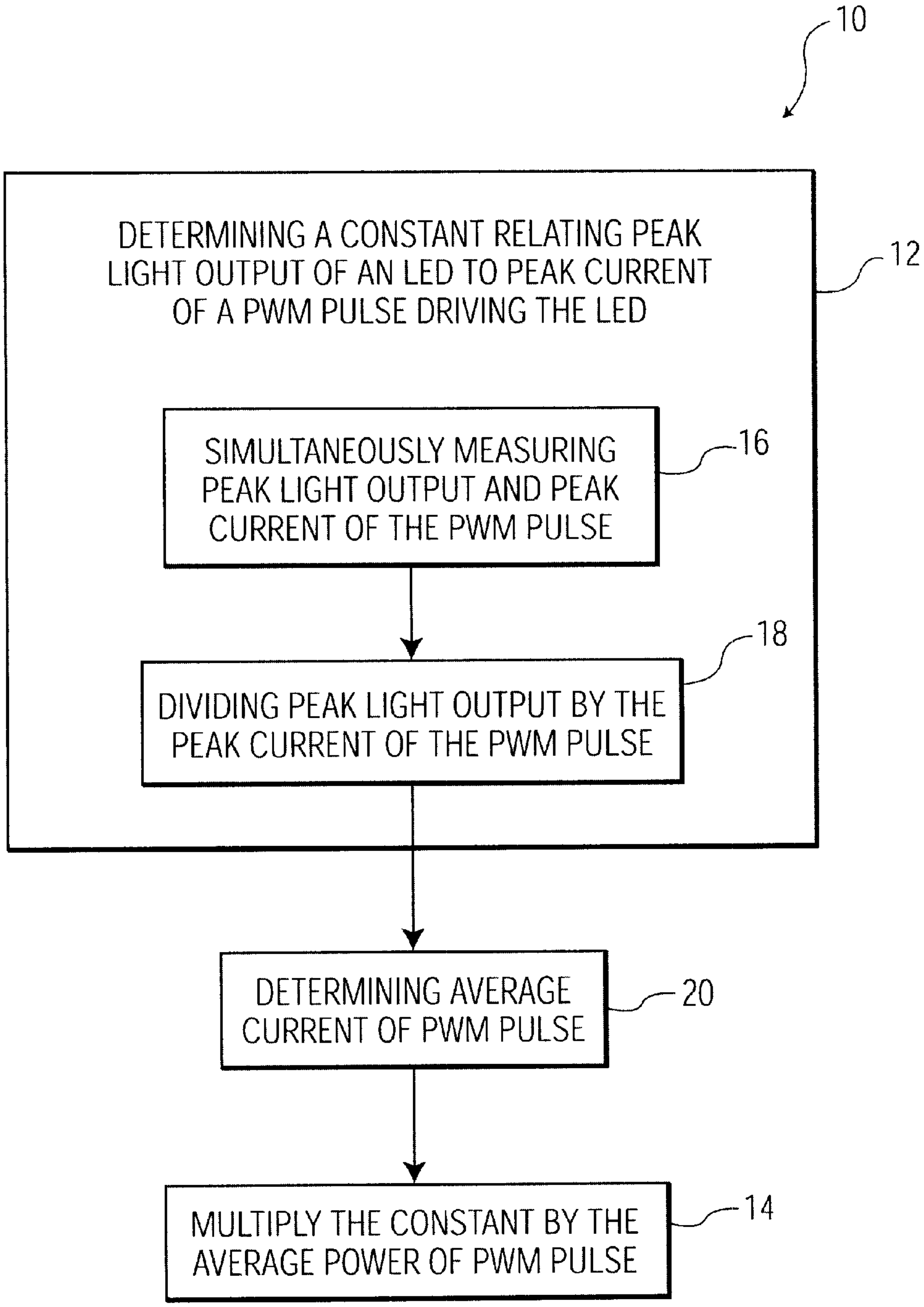
FIG. 2 is a flowchart showing a method, according to my invention, for determining the average light output of an LED.

FIG. 2 depicts a method 10 according to our invention for determining the average light output of an LED having a peak light output, when the LED is driven by a PWM pulse having a peak current and an average current. The method comprises determining a constant 12 relating the peak light output of the LED and the peak current of the PWM pulse, and multiplying 14 the average current of the PWM pulse by the constant to yield the average light output of the LED.

The constant may be calculated by simultaneously measuring 16 the peak light output of the LED and the peak current of the LED, and calculating the constant by dividing 18 the peak light output of the LED by the peak current in the PWM pulse. This method is illustrated in FIG. 1 by sampling pulse 1A, and associated points marked as "X1A" on the curves labeled "Current Pulses" and "Output of Photo Sensor." The simultaneous measurements of peak light output and peak current are preferably taken at a point during the duration $D_R$ of the PWM pulse where the pulse is fully developed and rise and fall time effects are not present.

Figure 4:
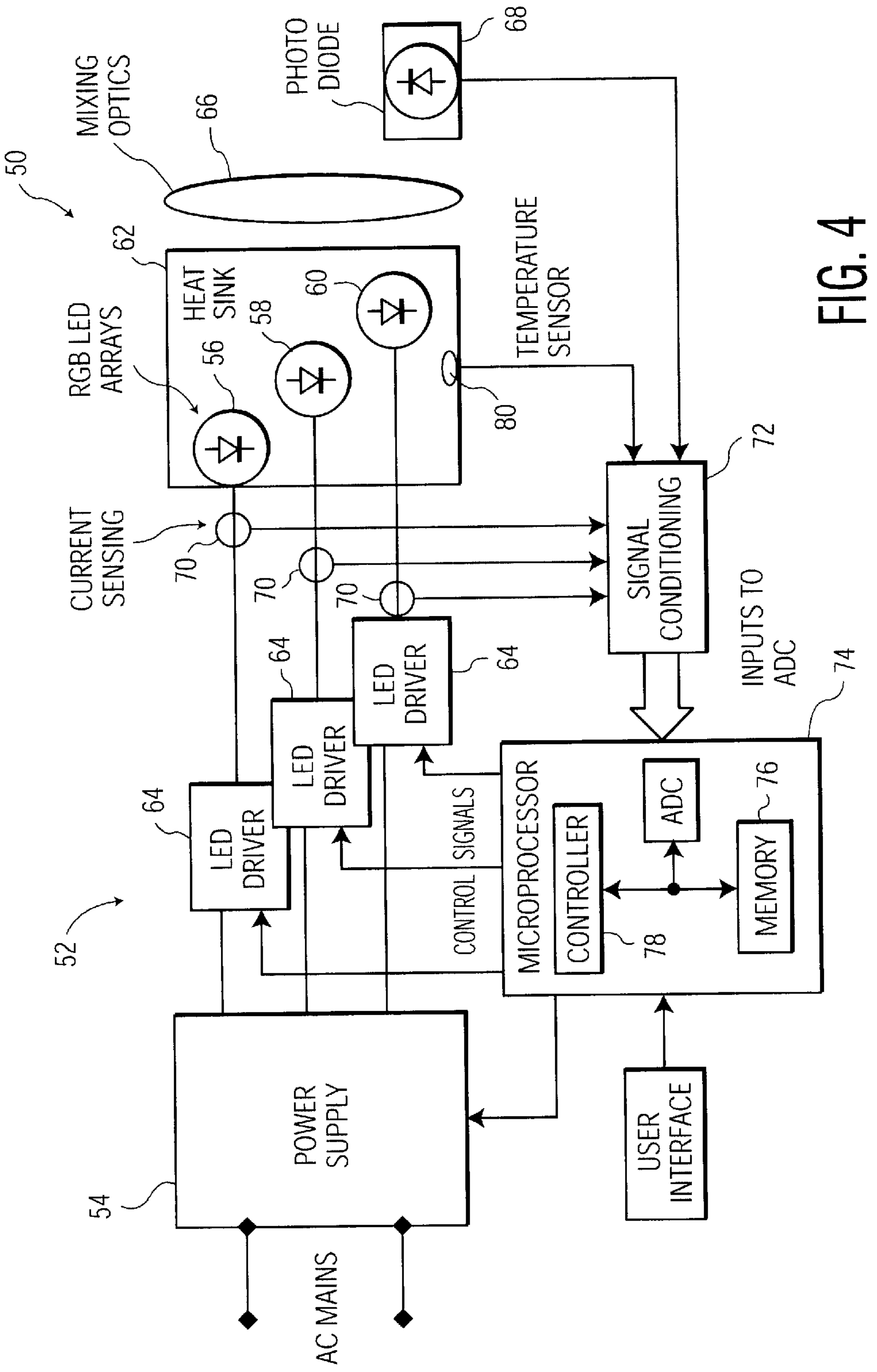
FIG. 4 is schematic representation of an exemplary apparatus for determining the average light output of an LED, in accordance with my invention.
Figure 5:
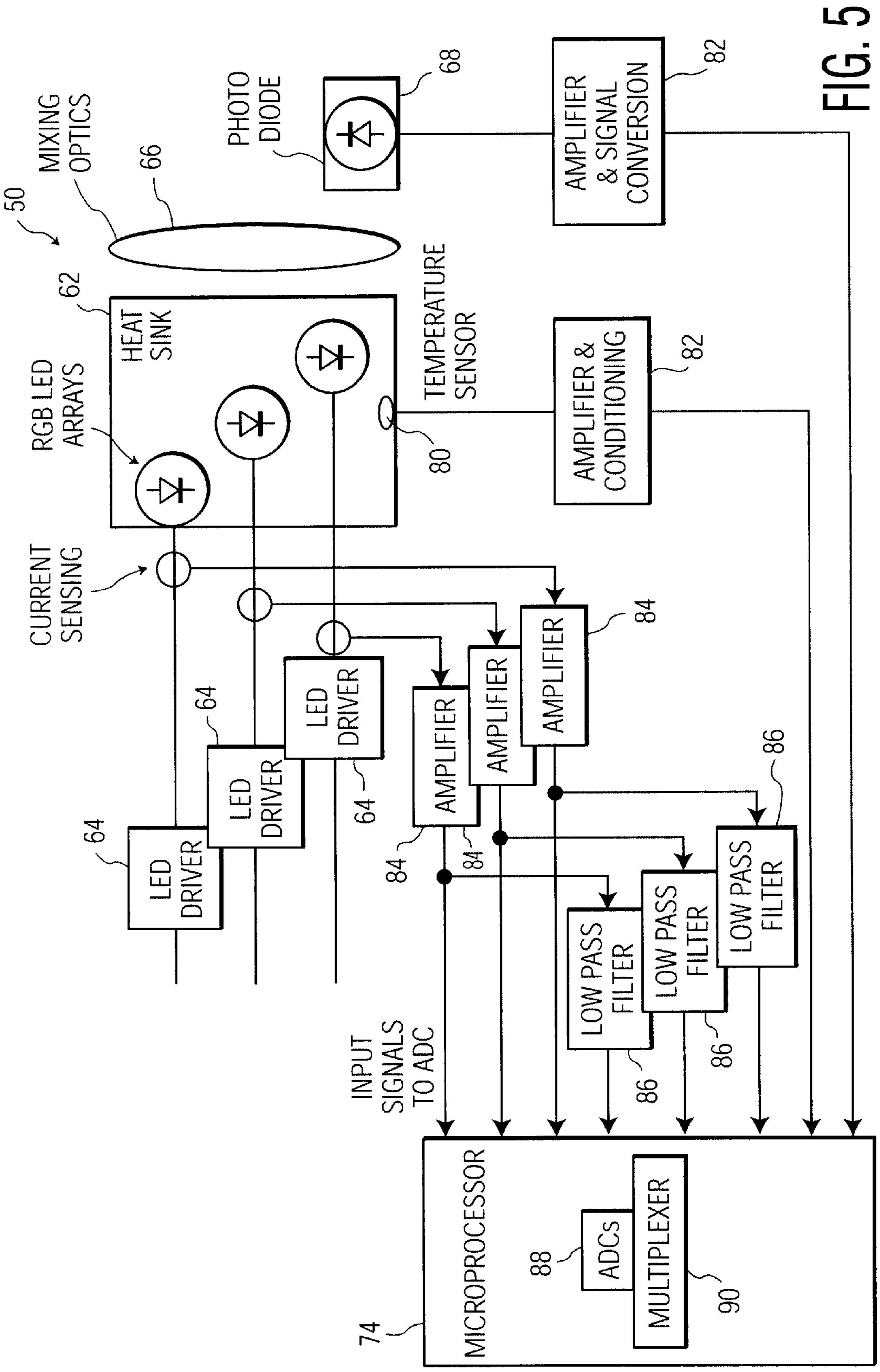
FIG. 5 as a schematic representation showing further details of the apparatus depicted in FIG. 4.

Determining the average current 20 of the PWM pulse may be accomplished by a variety of methods. For example, the average current 20 of the PWM pulse may be determined by monitoring and integrating the entire PWM pulse as a function of time. This may be accomplished by sampling the current using a high-speed analog to digital converter, and averaging the samples as a function of time in a computer or microprocessor, as shown in FIG. 4, to produce an average current signal as depicted by dashed lines in FIG. 1. Alternatively, as shown in FIG. 5, the current in the PWM pulse may be sensed and passed through a low-pass filter 86, or an integrator, configured for producing an average current signal, as depicted by the dashed lines in FIG. 1. Other methods known to those having skill in the art may also be utilized, for determining average current of the PWM pulse, in accordance with our invention, within the scope of the appended claims.

The method described thus far can also be practiced to determine the average light output of the blue LED in FIG. 1, by utilizing sampling pulses 3A, 3B, and X3A-B, by taking the simultaneous measurements and determining the average current a point during the duration $D_B$ of the PWM pulse where the pulse is fully developed and rise and fall time effects are not present, and the pulse driving the green LED does not overlap the PWM pulses driving the red or green LEDs.

Figure 3:
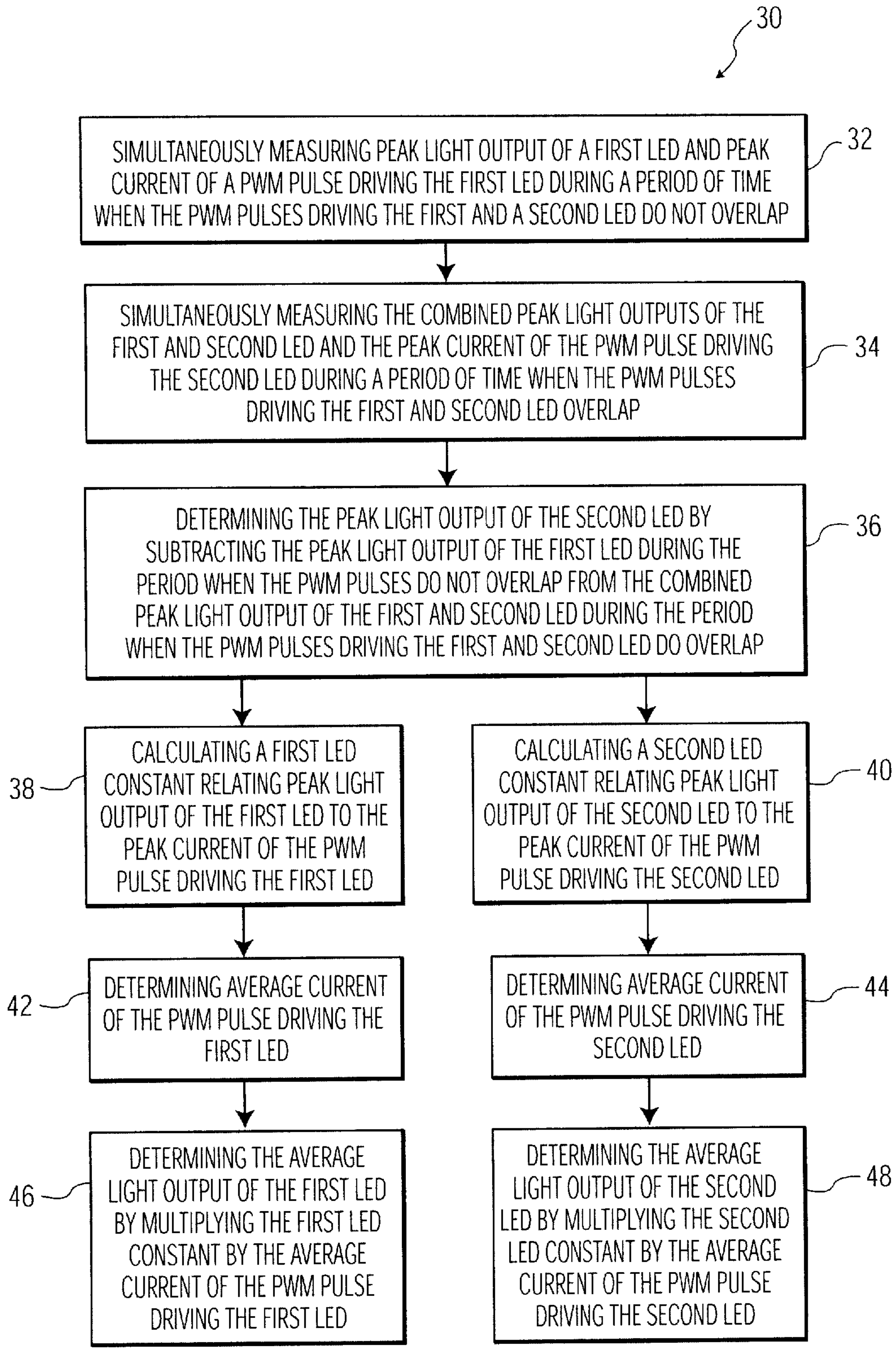
FIG. 3 is a flowchart showing a method, according to my invention, for determining the average light output of a first and a second LED of an LED array.

FIG. 3 depicts a method 30 for determining the light output of a first and a second LED, each having a peak light output, when the first and second LED are driven respectively by a first and a second PWM pulse which partially overlap as a function of time, and the output of the first and second LED is measured by a single light sensor receiving the combined light output of the first and second LED. This method may be used for determining the peak and average light output of the green LED of FIG. 1, where the PWM pulse driving the green LED always overlaps either or both of the PWM pulses driving the red and blue LED.

Considering the first LED to be the red LED and the second LED to be the green LED of FIG. 1. The method 30 comprises simultaneously measuring 32 the peak light output and peak current of one of the first and second (red and green) LEDs at a point in time (1A, X1A) when the first and second (red and green) PWM pulses do not overlap as a function of time. The method further includes simultaneously measuring 34 the combined peak light outputs of the first and second (red and green) LEDs and the peak current of the PWM pulse driving the second (green) LED during a period of time (2A, X2A) when the PWM pulses driving the first and second (red and green) LED overlap. The peak light output of the second (green) LED is obtained by subtracting 36 the peak light output of the first (red) LED measured during the period when the PWM pulses do not overlap from the combined peak light output of the first and second (red and green) LED measured during the period of time when the PWM pulses driving the first and second (red and green) LED do overlap.

Once the peak light outputs and peak currents of the first and second (red and green) LEDs and the PWM pulses driving them are known, the constants relating the peak light output and the peak currents of the first and second LEDs can be calculated 38, 40 by dividing the peak light output by the peak current. The average current for the pulses driving each of the LEDs can then be determined 42, 44, as described above, and the average light output of the LED's can be determined 46, 48 by multiplying the constant for each LED by the average current in the PWM pulse driving that LED.

Those having skill in the art will recognize that the methods described above and depicted in FIGS. 1–3 may be utilized to determine the average light output of arrays having more than two LEDs driven by PWM pulses that partially overlap as a function of time.

FIGS. 4 and 5 depict various aspects of exemplary forms of an apparatus 50 for determining the average light output of an LED having a peak light output when the LED is being driven by a PWM pulse having a peak current and average current. The apparatus 50 is applied to a white light source 52 having a power supply 54 driving RGB LED arrays having a red LED 56, a green LED 58, and a blue LED 60 mounted on a heat sink 62. The LEDs 56, 58, 60 are coupled to the power supply by LED drivers 64 that supply PWM current pulses for driving the LEDs.

The apparatus 50 includes means, in the form of a photo diode 68, current sensors 70, and signal conditioning devices 72 that provide signals to a microprocessor 74 for determining a constant for each LED relating the peak light output of each LED to the peak current of the PWM pulse driving each LED. The current sensors 70 and the photo diode 68 are configured for simultaneously measuring the peak light output of one or more of the LEDs 56, 58, 60 and the peak current of the PWM pulses producing the light. The microprocessor 74 determines the constant by dividing the measured peak light output of one of the LEDs 56, 58, 60 by the peak current for that LED measured simultaneously with the peak light output.

The microprocessor 74 also provides means for determining the average current of the PWM pulses, and for multiplying the average current of the PWM pulses driving the RGB LED arrays by their respective constants. Average current of the PWM pulses can be computed by monitoring the PWM pulse with a current sensor 70, and integrating the current over time. The current sensors 70 and microprocessor 74 may also be used to sample the current in the PWM pulse over a short duration of the pulse and for extrapolating the average current value using information relating to the PWM pulse duration and repetition rate stored in a memory 76 of the microprocessor 74.

FIG. 5 illustrates a form of our invention in which the average current is determined by sensing the current of the PWM pulse, and passing the sensed current through a low-pass filter 86, configured for providing an average current signal, as depicted by the dashed lines in FIG. 1.

The memory 76 and the microprocessor 74 may also be configured to further facilitate computation of the constants. The microprocessor 74 may also include a controller 78 configured for providing control signals to the LED drivers for adjusting the PWM pulses in a manner required to obtain a desired light output and performance of the white light source 52.

A temperature sensor 80 may also be included in the apparatus 50 to determine how often the apparatus 50 should measure average light output of the LEDs and adjust the PWM signal to achieve desired performance of the light source 52. While it is certainly possible to utilize the apparatus 50 and methods 10, 40 described herein to determine average light output of the LEDs during every PWM period, it may not be necessary or desirable to determine the average light output that often. It may instead be desirable to have the microprocessor 74 programmed for periodically determining the average light output per some predetermined schedule, or to have the microprocessor 74 determine the average light output and adjust the PWM pulses according to parameters stored in the memory 76 when a monitored parameter, such as the heat sink temperature, falls outside of a predetermined operating range.

FIG. 5 shows that the signal conditioning devices 72 of the apparatus 50 may include amplifiers and signal conditioners 82 for the photo diode 68 and the temperature sensor 80. The apparatus 50 may also include analog to digital converters (ADC) 88 and a multiplexer 90 to coordinate the taking of the simultaneous measurements required in practicing our invention.

Our invention may also take the form of a code on a computer readable medium having instructions for determining the average light output of an LED having a peak light output when driven by a PWM pulse having a peak current and an average current. The code may include instructions for determining a constant relating the peak light output of the LED and the peak current of the PWM pulse, and instructions for multiplying the average current of the PWM pulse by the constant.

The instructions for determining the constant may include instructions for simultaneously measuring the peak light output of the LED and the peak current of the PWM pulse, and instructions for calculating the constant by dividing the peak light output by the peak current.

The code may further include instructions for determining the average value of current in the PWM pulse. These instructions may include instructions for determining the average current by integrating the current in the PWM pulse over time, or alternatively by sensing the PWM current and passing the sensed current through a low-pass filter configured for producing an average value of PWM current.

The code may also include instructions for determining the average light output of a first LED and a second LED, each having a peak light output, when the first and second LED are driven respectively by a first and a second PWM pulse, with the first and second PWM pulses each having a peak current and an average current, by determining a first constant relating peak light output of the first LED with the peak current of the first PWM pulse, and multiplying the average current of the first PWM pulse by the first LED constant. If the PWM pulses do not overlap as a function of time, the average light output of the second LED is computed by determining a constant relating the peak light output to the peak current driving the second LED, and multiplying the second LED constant by the average current in the PWM pulse driving the second LED.

Where the first and second PWM pulses driving the first and second LEDs overlap as a function of time, and the combined peak light output of the first and second LEDs is measured with a single light sensor, the code may include instructions for simultaneously measuring the peak light output and peak current of one of the first and second LEDs at a point in time when the first and second PWM pulses do not overlap. The code may also include instructions for simultaneously measuring the peak light output from both the first and second LEDs and the peak current driving the other of the first and second PWM pulses at a point in time when the first and second pulses do overlap as a function of time. The code may further include instructions for determining the peak light output of the other of the first and second LEDs by subtracting the peak light output measured for the one of the first and second LEDs at the point in time when the first and second PWM pulses do not overlap from the combined peak light output of the first and second LEDs measured at the point in time when the first and second PWM pulses do overlap each other.

The code may further include instructions for determining the average value of current in the second PWM pulse. These instructions may include instructions for determining the average current by integrating the current in the second PWM pulse over time, or alternatively by sensing the current in the second PWM pulse, and passing the sensed current through a low-pass filter configured for producing an average current value of the second PWM pulse.

The code may further include instructions for determining the average light output of a third LED having a peak light output, when the first, second, and third LED are driven respectively by a first, a second, and a third PWM pulse, with each of the first, second, and third PWM pulses having a peak current and an average current, and wherein the first, second, and third PWM pulses partially overlap each other as a function of time, and further wherein the peak light outputs of the first, second, and third LED are measured with a single light sensor. The code may include instructions for determining a third LED constant relating the peak light output of the third LED with the peak current of the third PWM pulse, and instructions for multiplying the average current in the third PWM pulse by the third LED constant. The code may further include instructions for determining the third LED constant by simultaneously measuring peak light output and peak current of the third LED at a point in time when the first, second, and third PWM pulses do not overlap as a function of time, and instructions for dividing the peak light output of the third LED by the peak current of the third LED.

The code may further include instructions for determining the average value of current in the third PWM pulse. These instructions may include instructions for determining the average current by integrating the current in the third PWM pulse over time, or alternatively by sensing the current in the third PWM pulse, and passing the sensed current through a low-pass filter configured for producing an average current value of the third PWM pulse.

The code may further include instructions for multiplying the third LED constant by the average value of the current in the third PWM pulse. Those skilled in the art will readily recognize that the code may include instructions for practicing our invention with light sources having more than three LEDs and other combinations of partially overlapping PWM sequences.

Although the forgoing description has utilized certain exemplary embodiments of my invention, many other changes and modifications can be made without departing from the spirit and scope of my invention. For example, the term "single light sensor" as used herein is contemplated to include arrangements where several sensors are utilized in conjunction with one another to function as one unit. The term LED as used herein is also contemplated to include LED arrays functioning as one unit.

The scope of our invention is limited only by the appended claims, and all changes that come within the meaning and range of equivalents are intended to be embraced therein.

We claim:

1. A method for determining the average light output of an LED having a peak light output, with the LED being driven by a PWM pulse having a peak current and an average current, the method comprising:

determining a constant relating the peak light output of the LED and the peak current of the PWM pulse; and multiplying the average current of the PWM pulse by the constant.

2. The method of claim 1 wherein determining the constant comprises simultaneously measuring the peak light output of the LED and the peak current of the PWM pulse and calculating the constant by dividing the peak light output by the peak current.

3. The method of claim 2 further comprising:

determining the average value of current in the PWM pulse.

4. The method of claim 2 further comprising:

determining the average value of current in the PWM pulse by integrating the current in the PWM pulse over time.

5. The method of claim 2 further comprising:

determining the average value of current in the PWM pulse by passing the current in the PWM pulse through a low pass filter configured for producing an average value of current in the PWM pulse.

6. The method of claim 3 further comprising:

multiplying the constant by the average value of the current in the PWM pulse.

7. The method of claim 1 further comprising:

determining the average value of current in the PWM pulse by integrating the current value of PWM pulse over time.

8. A method for determining the average light output of a first LED of a first and a second LED, each having a peak light output, when the first and second LED are driven respectively by a first and a second PWM pulse, with the first and second PWM pulses each having a peak current and an average current, the method comprising:

determining a first LED constant relating the peak light output of the first LED with the peak current of the first PWM pulse; and multiplying the average current of the first PWM pulse by the first LED constant.

9. The method of claim 8 wherein determining the first LED constant comprises simultaneously measuring the peak light output of the first LED and the peak current of the first PWM pulse and calculating the first LED constant by dividing the peak light output of the first LED by the peak current of the first PWM pulse.

10. The method of claim 9 further comprising:

determining the average value of current in the first PWM pulse.

11. The method of claim 9 wherein the first and second PWM pulses partially overlap as a function of time and the peak light output of the first and second LED are measured with a single light sensor, the method further comprising:

simultaneously measuring the peak light output and peak current of one of the first and second LEDs at a point in time when the first and second PWM pulses do not overlap as a function of time;

simultaneously measuring the peak light output from both of the first and second LEDs and the peak current of the other of the first and second PWM pulses at a point in time when the first and second PWM pulses overlap as a function of time; and determining the peak light output of the other of the first and second LEDs by subtracting the peak light output measured for the one of the first and second LEDs at the point in time when the first and second PWM pulses do not overlap from the combined peak light output of the first and second LED's measured at the point in time when the first and second PWM pulses do overlap.

12. The method of claim 11 further comprising:

determining the second LED constant by measuring the peak current of the second PWM pulse simultaneously with measuring the combined peak light output of the first and second LEDs; and dividing the peak light output of the second LED by the peak current of the second PWM pulse.

13. The method of claim 12 further comprising:

determining the average value of current in the second PWM pulse.

14. The method of claim 13 for further determining the average light output of a third LED having a peak light output, when the first, second, and third LED are driven respectively by a first, a second, and a third PWM pulse, with the first, second, and third PWM pulses each having a peak current and an average current, and wherein the first, second, and third PWM pulses partially overlap as a function of time and the peak light output of the first, second, and third LED are measured with the single light sensor, the method further comprising:

determining a third LED constant relating the peak light output of the third LED with the peak current of the third PWM pulse, and multiplying the average current of the third PWM pulse by the third LED constant.

15. The method of claim 14 further comprising:

determining the third LED constant by simultaneously measuring the peak light output and peak current of the third LED at a point in time when the first, second, and third PWM pulses do not overlap as a function of time; and dividing the peak light output of the third LED by the peak current of the third LED.

16. The method of claim 15 further comprising:

determining the average value of current in the third PWM pulse.

17. The method of claim 16 further comprising:

multiplying the third LED constant by the average value of the current in the third PWM pulse.

18. An apparatus for determining the average light output of an LED having a peak light output, with the LED being driven by a PWM pulse having a peak current and an average current, the apparatus comprising:

means for determining a constant relating the peak light output of the LED and the peak current of the PWM pulse; and means for multiplying the average current of the PWM pulse by the constant.

19. The apparatus of claim 18 wherein the means for determining the constant comprises:

means for simultaneously measuring the peak light output of the LED and the peak current of the PWM pulse; and means for calculating the constant by dividing the peak light output by the peak current.

20. Code on a computer readable medium for determining the average light output of an LED having a peak light output, with the LED being driven by a PWM pulse having a peak current and an average current, the code comprising instructions for determining a constant relating the peak light output of the LED and the peak current of the PWM pulse, and instructions for multiplying the average current of the PWM pulse by the constant.

21. The code of claim 20 wherein the instructions for determining the constant comprises instructions for simultaneously measuring the peak light output of the LED and the peak current of the PWM pulse and instructions for calculating the constant by dividing the peak light output by the peak current.

* * * * *